United States Patent
Jahromi et al.

(10) Patent No.: US 7,430,596 B2
(45) Date of Patent: Sep. 30, 2008

(54) INTEGRATING ELECTRONIC MESSAGING DIAGNOSTICS INTO A MESSAGING PIPELINE

(75) Inventors: Babak G. Jahromi, Bellevue, WA (US); John F. Noss, Issaquah, WA (US); Dhananjay M. Mahajan, Sammamish, WA (US); Scott Christopher Seely, Bellevue, WA (US); Daniel W. Roth, Bellevue, WA (US); Travis John Muhlestein, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 10/925,207

(22) Filed: Aug. 24, 2004

(65) Prior Publication Data

US 2006/0047846 A1    Mar. 2, 2006

(51) Int. Cl.
  *G06F 15/173* (2006.01)
  *G06F 11/00* (2006.01)
(52) U.S. Cl. .............................. 709/223; 714/4; 714/43
(58) Field of Classification Search ................. 709/206, 709/223, 224, 232; 714/4, 43
See application file for complete search history.

(56) References Cited

U.S. PATENT DOCUMENTS

| | | | | |
|---|---|---|---|---|
| 6,023,581 A * | 2/2000 | Matsuura | .................. | 714/4 |
| 6,993,683 B2 * | 1/2006 | Bhat et al. | .................. | 714/43 |
| 7,290,048 B1 * | 10/2007 | Barnett et al. | ............... | 709/223 |
| 7,308,597 B2 * | 12/2007 | Bhat et al. | .................. | 714/4 |
| 2005/0172175 A1 * | 8/2005 | Bhat et al. | .................. | 714/43 |
| 2006/0047846 A1 * | 3/2006 | Jahromi et al. | ............. | 709/232 |
| 2006/0069713 A1 * | 3/2006 | Wei et al. | ................... | 709/202 |
| 2006/0075045 A1 * | 4/2006 | Wei et al. | ................... | 709/206 |
| 2008/0034367 A1 * | 2/2008 | Patrick et al. | ............... | 718/101 |
| 2008/0059625 A1 * | 3/2008 | Barnett et al. | ............... | 709/223 |
| 2008/0148099 A1 * | 6/2008 | Bhat et al. | .................. | 714/25 |

* cited by examiner

*Primary Examiner*—George C. Neurauter, Jr.
*Assistant Examiner*—J. Bret Dennison
(74) *Attorney, Agent, or Firm*—Workman Nydegger (57) ABSTRACT

The present invention extends to methods, systems, and computer program products for integrating messaging diagnostics into a messaging pipeline. A messaging pipeline receives a control message and passes the control message through one or more pipeline components (potentially a security component) positioned in the messaging pipeline. The control message is passed to a diagnostic control component positioned in the messaging pipeline subsequent to passing the received control message through one or more pipeline components. The diagnostic control component activates message diagnostics at diagnostic components positioned within one or more messaging pipelines in accordance with instructions contained in the control message. When message diagnostics are activated, messaging pipelines pass accessed messages to diagnostic components positioned in the messaging pipeline. The diagnostic components perform diagnostic operations based on the contents of the accessed message in accordance with instructions contained in the previously processed (and potentially authenticated) control message.

41 Claims, 3 Drawing Sheets

INTEGRATING ELECTRONIC MESSAGING DIAGNOSTICS INTO A MESSAGING PIPELINE

CROSS-REFERENCE TO RELATED APPLICATIONS

Not applicable.

BACKGROUND OF THE INVENTION

1. The Field of the Invention

The present invention relates to electronic messaging technology; and more specifically, to mechanisms for integrating messaging diagnostics into a messaging pipeline.

2. Background and Related Art

Computer systems and related technology affect many aspects of society. Indeed, the computer system's ability to process information has transformed the way we live and work. Computer systems now commonly perform a host of tasks (e.g. information management, scheduling, and word processing) that prior to the advent of the computer system were typically performed manually. More recently, computer systems have been coupled to one another to form computer networks over which computer systems may transfer data electronically.

Initially, a significant portion of data transfer on computer networks was performed using specific applications (e.g., electronic mail applications) to transfer data files from one computer system to another computer. For example, a first user at a first networked computer system could electronically mail a word processing document to a second user at a second networked computer system. However, program execution (e.g., running the electronic mail application) and data access (e.g., attaching the word processing document to an electronic mail message) were essentially completely performed at single computer system (e.g., the first computer system). That is, a computer system would execute programs and access data from storage locations contained within the computer system. Thus, being coupled to a network would not inherently give one networked computer system the ability to access data from another networked computer system. Only after a user actively sends data to a computer system could the computer system access the data.

However more recently, as the availability of higher-speed networks has increased, many computer networks have shifted towards a distributed architecture. Such networks are frequently referred to as distributed systems. Distributed systems function to "distribute" program execution and data access across the modules of a number of different computer systems coupled to a network.

In a distributed system, modules connected to a common network interoperate and communicate between one another (e.g., exchanging electronic messages) in a manner that may be transparent to a user. For example, a user of a client computer system may select an application program icon from a user-interface thereby causing an application program stored at a server computer system to execute. The user-interface may indicate to the user that the application program has executed, but the user may be unaware, and in fact may not care, that the application program was executed at the server computer system. The client computer system and the server computer system may exchange electronic messages in the background to transfer the user's commands, program responses, and data between the client computer system and the server computer system.

Often, a distributed system includes a substantial number of client computer systems and server computer systems. In many cases, computer systems of a distributed system may function both as client computer systems and server computer systems, providing data and resources to some computer systems and receiving data and resources form other computer systems. Each computer system of a distributed system may include a different configuration of hardware and software modules. For example, computer systems may have different types and quantities of processors, different operating systems, different application programs, and different peripherals. Additionally, the communications path between computer systems of a distributed system may include a number of networking components, such as, for example, firewalls, routers, proxies and gateways, and communication paths can change from time to time.

In some environments, "distributed applications", such as, for example, Web services applications, are specifically designed for execution in a distributed system (e.g., the Internet). Distributed applications can include hundreds or thousands of modules and each module can be compiled from thousands or even millions of lines of source code. Further, each module of a distributed application must be design to appropriately communicate with other modules of the distributed application, as well as other modules in associated distributed systems. For example, interoperation of different modules of a distributed application can require exchanging electronic messages (e.g., Simple Object Access Protocol ("SOAP") envelopes) according to specified security and policy requirements. Thus, the design and configuration of distributed applications is significantly more complex than for stand-alone applications.

Due at least in part to this complexity, communication between portions of distributed applications (even those that are properly configured) may operate in an undesirable manner from time to time. As such, it is often desirable to perform diagnostic operations (e.g., testing, debugging, profiling, and tracing) on electronic messages exchanged between modules of a distributed application.

For example, some diagnostic techniques used on distributed applications is to attach, or "glue on," a separate third-party diagnostic process to distributed application modules. As electronic messages are exchanged with the module, the third-party diagnostic process records diagnostic data to a log file. In some cases, third-party diagnostic processes are attached to a number of different distributed application modules and each third-party diagnostic process records data to a separate log file. The separate log files are then combined and correlated to give some indication of what may be causing undesirable communication between portions of a distributed application.

Unfortunately, attaching separate third-party diagnostic processes to distributed application modules can be time consuming and can require that the corresponding distributed application be brought down and redirect the message traffic. Since distributed applications have modules at a plurality of different computer systems, properly bringing down a distributed application may require coordination between the administrators of the different computer systems and redirection of message traffic may involve additional coordination. Bringing down and re-directing a distributed application to attach third-party diagnostic processes can also result in users of the distributed application losing access to information and revenue.

Further, third-party diagnostic processes are often designed based on a one size fits all approach. That is third-party diagnostic processes may have standardized diagnostic operations with limited ability to configure the diagnostic operations for specific distributed applications. However, the complexity of individual distributed applications makes it difficult, if not impossible, to design third-party diagnostic processes to include all the possible diagnostic operations that could be performed. Thus, while third-party diagnostic processes may be sufficient for performing basic diagnostic operations, third-party diagnostic processes often lack functionality for more complex diagnostic operations (e.g., timing interactions and interdependencies).

Thus, distributed application designers can include specialized diagnostic code within distributed applications to implement more complex diagnostic operations. Specialized code can cause a distributed application to report information from different modules of the distributed application to a centrally located diagnostic module. Thus, diagnostic module is better positioned to determine what is causing undesirable behavior. However, the use of specialized diagnostic code has at least one inherent problem: specialized diagnostic code is often self-contained and will not interact with other diagnostic processes. Due to these incompatibilities, specialized diagnostic code must be individually developed for different distributed applications. This is time consuming and may require substantially technical expertise on the part of a programmer.

Further, typical diagnostic techniques offer little control over the type of diagnostic functions that are performed and the amount and type of data that is gathered. For example, some diagnostic processes (e.g., NetMon) add a message redirector between computer systems that are exchanging electronic messages. To implement diagnostic operations for an electronic message, the message redirector receives an electronic message that originated at a sender, access at least a portion of the contents (e.g., headers and bodies) of the electronic message, performs a diagnostic operation based on the accessed contents, and forwards the electronic message towards the destination.

In some environments, diagnostic operations need to be performed on secure data, such as, for example, data that is encrypted and/or digitally signed. Thus, a message redirector may be provided with security information (e.g., keys) for accessing electronic message contents. For example, to implement a diagnostic operation for a malfunctioning sales application, a message redirector may be provided keys for validating a digital signature and decrypting personal and financial data contained in electronic messages. Thus, at least for the time needed to provide the personal and financial data to a diagnostic module, the personal and financial data is available in an insecure (unencrypted) format. Depending on the implemented diagnostic operation, the message redirector may also log portions of the accessed data making them further available.

Since many distributed systems, such as, for example, the Internet, are shared by a large number of entities, manipulating sensitive data at an intermediate computer system poses a security risk. For example, a malicious user could attempt to compromise a message redirector and access exposed data. Alternately, a malicious user could design a program that impersonates a legitimate message redirector. The malicious user could run the program in an attempt to have distributed application modules transfer sensitive data and corresponding security information to the program.

Accordingly, what would be advantageous are mechanisms for securely and efficiently performing diagnostic operations for electronic messages.

BRIEF SUMMARY OF THE INVENTION

The foregoing problems with the prior state of the art are overcome by the principles of the present invention, which are directed to integrating messaging diagnostics into a messaging pipeline. A plurality of computer systems is connected to one another such that the computer systems can exchange electronic messages. In some embodiments, a computer system activates integrated messaging diagnostics in a messaging pipeline. A messaging pipeline receives a control message. The computer system passes the received control message through one or more pipeline components that are positioned in the messaging pipeline. The computer system passes the received control message to a diagnostic control component positioned in the messaging pipeline subsequent to passing the received control message through one or more pipeline components. The diagnostic control component activates message diagnostics at one or more diagnostic components positioned within one or more messaging pipelines in accordance with instructions contained in the received control message.

In other embodiments, a computer system implements a diagnostic operation in a messaging pipeline. The messaging pipeline accessed a message. The computer system passes the accessed message to a diagnostic component positioned in the messaging pipeline. The diagnostic component performs a diagnostic operation based on the contents of the accessed message in accordance with instructions contained in a previously processed control message.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention integrating messaging diagnostics into a messaging pipeline. A plurality of computer systems is connected to one another such that the computer systems can exchange electronic messages. In some embodiments, a computer system activates integrated messaging diagnostics in a messaging pipeline. A messaging pipeline receives a control message. The computer system passes the received control message through one or more pipeline components that are positioned in the messaging pipeline. The computer system passes the received control message to a diagnostic control component positioned in the messaging pipeline subsequent to passing the received control message through one or more pipeline components. The diagnostic control component activates message diagnostics at one or more diagnostic components positioned within one or more messaging pipelines in accordance with instructions contained in the received control message.

In other embodiments, a computer system implements a diagnostic operation in a messaging pipeline. The messaging pipeline accessed a message. The computer system passes the accessed message to a diagnostic component positioned in the messaging pipeline. The diagnostic component performs a diagnostic operation based on the contents of the accessed message in accordance with instructions contained in a previously processed control message.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

Figure 1:
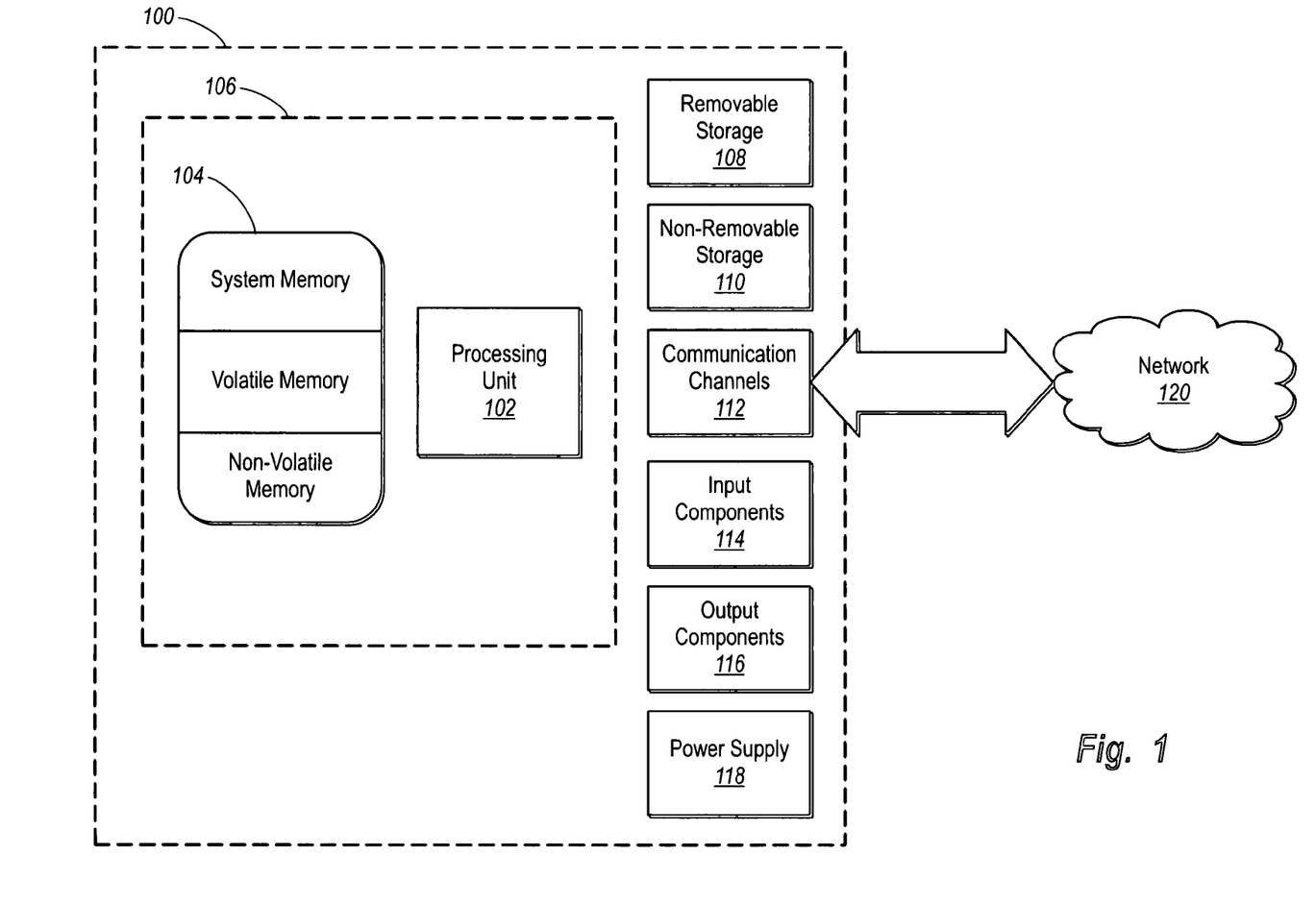
FIG. 1 illustrates a suitable computing system that may implement features of the present invention.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware. FIG. 1 shows a schematic diagram of an example computer architecture usable for these devices.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical, disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over a network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
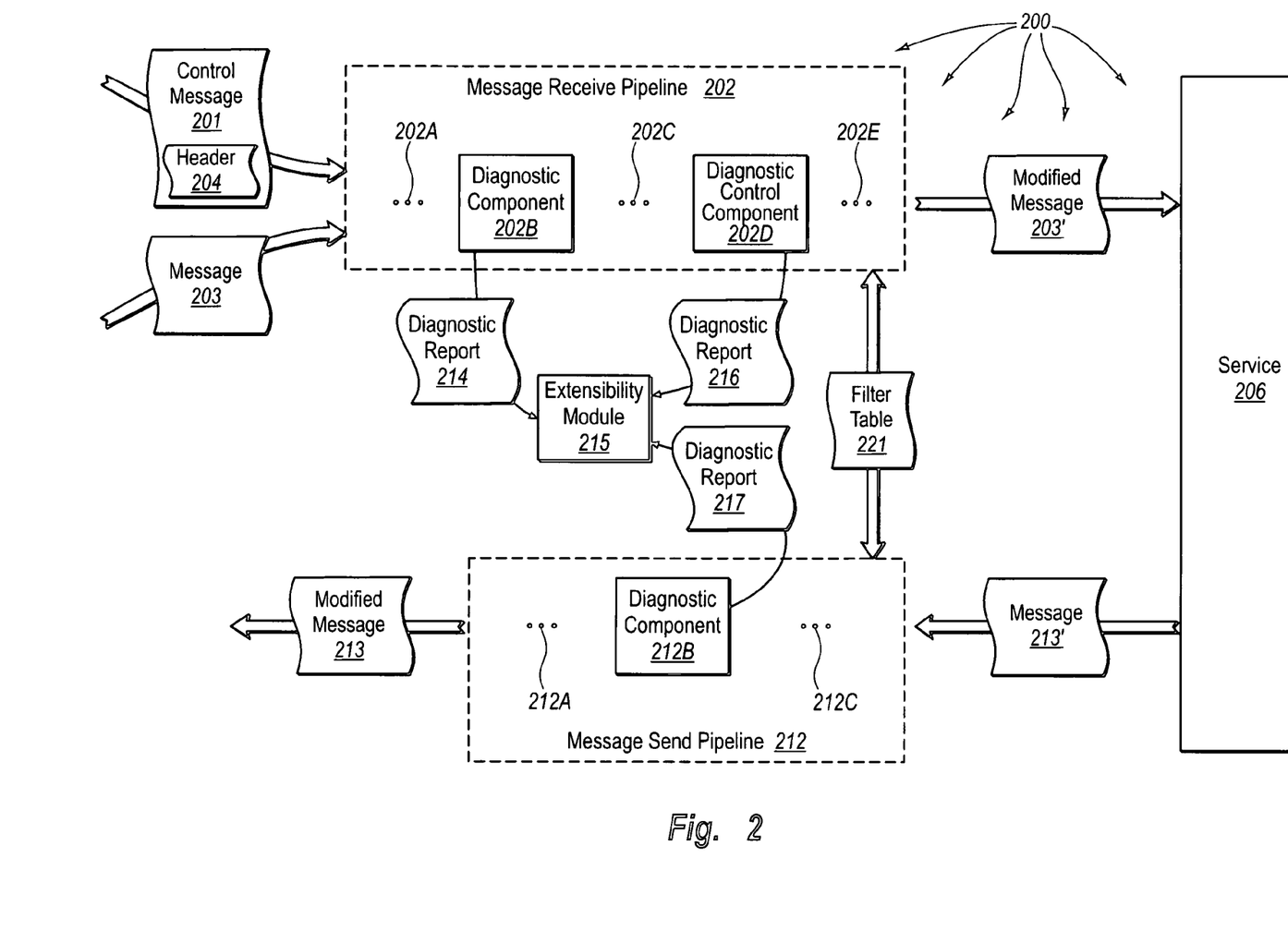
FIG. 2 illustrates various components that may cooperatively interact to activate integrated messaging diagnostics in a messaging pipeline and to implement an integrated diagnostic operation in a messaging pipeline.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length FIG. 2 illustrates a computer architecture 200 including components that may cooperatively interact to activate integrated messaging diagnostics in a messaging pipeline and to implement an integrated diagnostic operation in a messaging pipeline. When implemented in the context of the computer system 100 of FIG. 1, the various components may be instantiated in memory 104 and/or be persisted in persistent memory such as, for example, removable storage 108 and/or non-removable storage 110. The persistent memory may be, for example, a magnetic or optical disk.

Generally, message receive pipeline 202 receives and processes electronic messages, such as, for example, Simple Object Access Protocol ("SOAP") envelopes, containing data that is to be delivered to service 206 (e.g., a Web service). Message send pipeline 212 receives and processes data from service 206, such as, for example, data to be included in a SOAP envelope, for delivery to other computer systems. Each of the message pipelines 202 and 212 can include one or more message pipeline components that perform operations on electronic messages and message related data.

Generally, message pipeline components can be configured to modify electronic messages with at least one modification. For example, message pipeline components can add, delete, or change SOAP headers and bodies (e.g., adding, deleting, or changing Extensible Markup Language ("XML") instructions). Thus after receiving message 203 (e.g., a SOAP envelope), message receive pipeline 202 can modify message 203 resulting in modified message 203' (e.g., corresponding application data). Similarly, after receiving message 213' (e.g., application data), message send pipeline 212 can modify message 213'resulting in modified message 213 (e.g., a corresponding SOAP envelope).

Diagnostic component 202B and diagnostic control component 202D are expressly depicted within message receive pipeline 202. When activated, diagnostic component 202B can access the contents of electronic messages (e.g., SOAP headers and bodies), perform a corresponding diagnostic operation (e.g., debugging, testing, profiling, tracing, etc), and forward results of the diagnostic operation to an extensibility point (e.g., extensibility module 215). The extensibility point can store the results (either locally or remotely), can send the results across a network to another computer system (e.g., re-directing the results as a SOAP message to a (potentially secure) remote recipient), or can perform other operations on the results. Diagnostic control component 202D controls other diagnostic components and can also access the contents of electronic messages, perform corresponding diagnostic operations, and forward results to an extensibility point (e.g., extensibility module 215).

Horizontal ellipses 202A, 202C, and 202E represent that other message receive pipeline components, in addition to diagnostic component 202B and diagnostic control component 202D, can be included in message receive pipeline 202. For example, other message receive pipeline components can include a performance counters component, a role set component, a security component, a policy component, a rule administration component, a route component, a did understand component, and a receive comply component. Diagnostic component 202B and diagnostic control component 202D can be appropriately positioned between other message receive pipeline components to implement the principles of the present invention.

Diagnostic component 212B is expressly depicted within message send pipeline 212. When activated, diagnostic component 212B can access the contents of electronic messages (e.g., SOAP headers and SOAP bodies), perform a corresponding diagnostic operation (e.g., debugging, testing, profiling, tracing, etc), and send results of the diagnostic operation to an extensibility point (e.g., extensibility point 215). Horizontal ellipses 212A and 212C represent that other message send pipeline components, in addition to diagnostic component 212D and security component 212B, can be included in message send pipeline 212. For example, other message send pipeline components can include a transmit component, a security component, and a policy component. Diagnostic component 212D can be appropriately positioned between other message send pipeline components to implement the principles of the present invention.

Diagnostic control component 202D can load and unload filters included in filter table 221 to turning message diagnostics on and off and control diagnostic operations. Diagnostic control component 202D can also communicate with other diagnostic components (e.g., diagnostic components 202B and 212D) to turn message diagnostics on and off and control other diagnostic component's diagnostic operations. For example, diagnostic control component 202D can cause diagnostics components 202B and 212D to load and unload filters included in filter table 221. Filters can be loaded to and unload from memory, such as, for example, system memory 104.

Filter table 221 includes one or more message filters that can be used to indicate when message diagnostics are to be performed. Generally, when a diagnostic component (or diagnostic control component) accesses an electronic message, the diagnostic component (or diagnostic control component) determines if corresponding message content matches a loaded message filter. When message content matches a loaded message filter, the diagnostic component (or diagnostic control component) can perform a diagnostic operation, such as, for example, debugging, testing, profiling or tracing message content or other message related data. On the other hand when message content does not match a loaded message filter, the diagnostic component (or agnostic control component) does not perform a diagnostic operation. Filters in filter table 221 can include filter criteria indicating message content that is to be matched and can include filter actions indicating what to do when a match is detected. Filter criteria and filter actions can be represented using an XML Path Language ("XPath") statement although this is not required.

Figure 3:
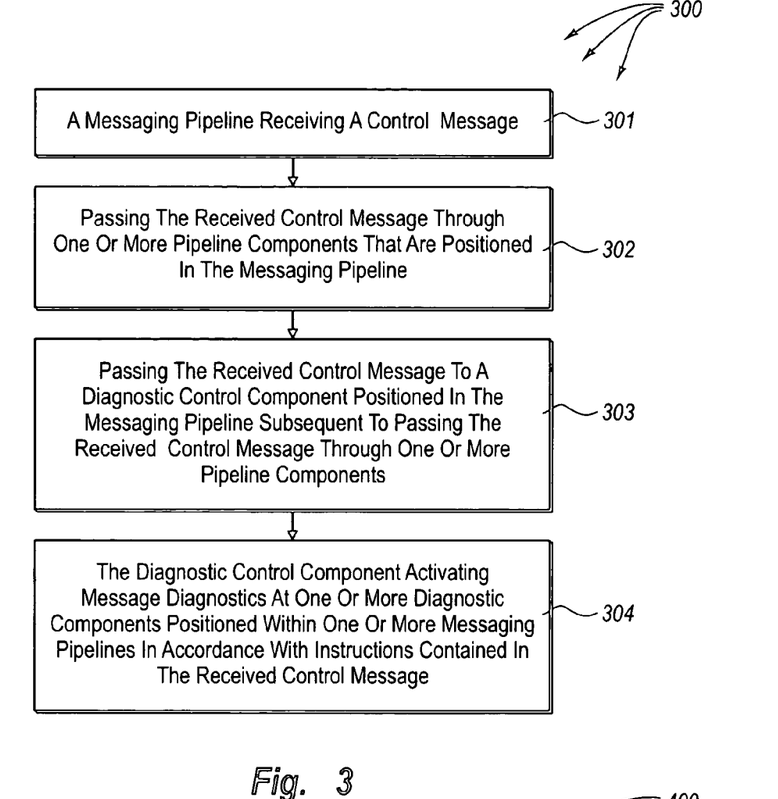
FIG. 3 illustrates a flowchart of method for activating integrated messaging diagnostics in a messaging pipeline.

FIG. 3 illustrates a flowchart 300 of method for activating integrated messaging diagnostics in a messaging pipeline. Method 300 will be described with respect to the components and data in computer architecture 200.

Method 300 includes an act of a messaging pipeline receiving a control message (act 301). For example, message receive pipeline 202 can receive control message 201. Control message 201 includes header 204 that indicates a message diagnostic configuration (e.g., filters that are to be loaded and loaded). However, a diagnostic configuration can also be included in a message body. Header 204 can include an indication that the diagnostic configuration is to be delivered to diagnostic control component 202E.

Method 300 includes an act of passing the received control message through one or more pipeline components that are positioned in the messaging pipeline (act 302). For example, control message 201 can be passed through diagnostic component 202B and other components represented by horizontal ellipsis 202A and 202C.

In some embodiments, method can include an act of passing the received control message to a security component subsequent to the received control message being passed through the one or more receiving pipeline components. For example, control message 201 can be pass to a security component positioned prior to diagnostic control component 202D (e.g., as represented by horizontal ellipsis 202C). Method 300 can include an act of the security component authenticating a sender and contents of the received control message. For example, a security component can authenticate the sender and contents (e.g., header 204) of control message 201.

Method 300 includes an act of passing the received control message to a diagnostic control component positioned in the messaging pipeline subsequent to passing the received control message through one or more pipeline components (act 303). For example, control message 201 can be passed to diagnostic control component 202D subsequent to passed through diagnostic component 202B and other components represented by horizontal ellipsis 202A and 202C. It may be that control message 201 is passed to diagnostic control component 202D after being authentication by a security component in message receive pipeline 202.

Method 300 includes an act of the diagnostic control component activating message diagnostics at one or more diagnostic components positioned within one or more messaging pipelines in accordance with instructions contained in the received control message (act 304). For example, based on diagnostic configuration in header 204, diagnostic control component 202D can send instructions to load and/or unload message filters at diagnostic component 202B and/or diagnostic control component 202D and/or diagnostic component 212D. In response to the instructions, diagnostic component 202B, diagnostic control component 202D, and diagnostic component 212D can load and/or unload filters from filter table 221. Alternately, diagnostic control component 202D can send instructions to initiate message diagnostics or terminate message diagnostics. In response, a diagnostic component can become active (e.g., transition to a state that can load and unload filters) or inactive (e.g., transition to a sleep state or turn itself off) respectively.

Since message diagnostic activation is integrated into messaging pipelines (and not implemented at an intermediate computer system), message diagnostics can be activated more efficiently. For example, messaging pipeline modules may have access to uniform Application Program Interfaces (API's) that can be used to exchange information. Thus, developers may be relieved from having to configure distributed applications to interface with third-party diagnostic programs and from developing special code to activate message diagnostics. Further, when control message 201 is authenticated prior to being passed to diagnostic control component 202D, there is a reduced likelihood that the sender and contents of control message 201 have be altered. Thus, if the sender of control message 201 is authorized to activate and configure message diagnostics, there is increased confidence that message diagnostics are be activated in accordance with instructions from an authorized entity (e.g., an administrator).

Figure 4:
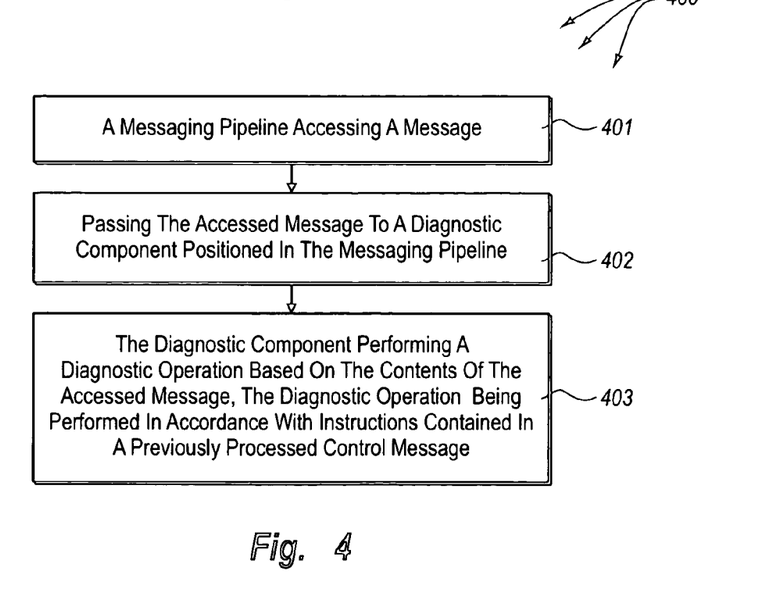
FIG. 4 illustrates a flowchart of a method for implementing an integrated diagnostic function in a messaging pipeline.

FIG. 4 illustrates a flowchart of a method 400 for implementing an integrated diagnostic function in a messaging pipeline. Method 400 will be described with respect to the components and data in computer architecture 200.

Method 400 includes an act of a messaging pipeline accessing a message (act 401). For example, message receive pipeline 202 can access message 203. Alternately, message send pipeline 212 can access modified message 213'. Method 400 includes an act of passing the accessed message to a diagnostic component positioned in the messaging pipeline (act 402). For example, message receive pipeline 202 can pass message 203 to diagnostic component 202B and/or diagnostic control component 202D. Alternately, message send pipeline 212 can pass message 213' to diagnostic component 212D.

Method 300 includes an act of the diagnostic component performing a diagnostic operation based on the contents of the accessed message (act 403). A diagnostic operation can be performed in accordance with instructions contained in a previously processed (and potentially authenticated) control message. For example, diagnostic component 202B, diagnostic control component 202D, and diagnostic component 212D can perform correspond diagnostic operations, such as, for example, debugging, testing, profiling or tracing, on messages 203 and 213 respectively. When appropriate, diagnostic component 202B, diagnostic control component 202D, and diagnostic component 212D can generate corresponding diagnostic reports 214, 216 and 217 respectively.

A diagnostic report can be generated in accordance with instructions contained in a previously processed (and potentially authenticated) control message. For example, in response to control message 201, one or more message filters from filter table 221 may be loaded at diagnostic component 202B, diagnostic control component 202D, and diagnostic component 212D. Diagnostic component 202B, diagnostic control component 202D, and diagnostic component 212D can attempt to match the contents of message 203 to filter criteria of the loaded filters. When a match is detected, a diagnostic operation can be performed and a diagnostic report, containing a portion of the contents of message 203, potentially generated.

Generated diagnostic reports (e.g., diagnostic reports 214, 216, and 217) can be forwarded to extensibility module 215. Extensibility module 215 can be included in the same computer system that includes message receive pipeline 202 and/or message send pipeline 212 or can be included in some other computer system. Thus, in some embodiments, diagnostic reports are generated and stored locally and generation and storage of the diagnostic reports do not involve communication with an intermediate computer system.

Since performance of message diagnostic operations is integrated into messaging pipelines (and not implemented at an intermediate computer system), message diagnostics can be performed more efficiently. For example, messaging pipeline modules may have access to uniform Application Program Interfaces ("API's") that can be used to exchange information. Thus, developers may be relieved from having to configure distributed applications to interface with third-party diagnostic programs and from developing special code to perform message diagnostics. Further, since message diagnostics can be implemented in accordance with a previously authenticated control message, there is increased confidence that message diagnostics are to be performed in accordance with instructions from an authorized entity.

Method 400 can also include an act of passing the accessed message through one or more message pipeline components that are positioned in the message pipeline of the accessed message subsequent to performing a diagnostic operation. For example, message 203 can be passed through other message receive pipeline components, in addition to diagnostic component 202B and diagnostic control component 202D. Alternately, message 213' can be passed through other message send pipeline components, in addition to diagnostics component 212D.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network environment that includes a computing system capable of transferring messages between other computing systems in the network environment, a method for activating integrated messaging diagnostics in a messaging pipeline, the method comprising the following:

an act of the messaging pipeline receiving a control message;

an act of passing the received control message through one or more pipeline components that are positioned in the messaging pipeline;

an act of passing the received control message to a diagnostic control component positioned in the messaging pipeline subsequent to passing the received control message through one or more pipeline components; and an act of the diagnostic control component activating message diagnostics at one or more diagnostic components positioned within one or more messaging pipelines in accordance with instructions contained in the received control message.

2. The method as recited in claim 1, wherein the act of the messaging pipeline receiving a control message comprises an act of the messaging pipeline receiving a Simple Object Access Protocol (SOAP) envelope.

3. The method as recited in claim 1, wherein the act of the messaging pipeline receiving a control message comprises an act of a messaging receive pipeline receiving a control message.

4. The method as recited in claim 1, wherein the act of passing the received control message through one or more pipeline components that are positioned in the messaging pipeline comprises an act of passing the control message through one or more pipeline components of a messaging receive pipeline.

5. The method as recited in claim 1, wherein the act of passing the received control message to a diagnostic control component comprises an act of passing the received control message to a diagnostic control component subsequent to passing the received control message through a security component.

6. The method as recited in claim 1, wherein the act of passing the received control message to a diagnostic control component comprises an act of passing the received control message to a diagnostic control component in a messaging receive pipeline.

7. The method as recited in claim 1, wherein the act of the diagnostic control component activating message diagnostics at one or more diagnostic components comprises an act of activating messaging diagnostics at a diagnostic component in a receive messaging pipeline.

8. The method as recited in claim 1, wherein the act of the diagnostic control component activating message diagnostics at one or more diagnostic components comprises an act of activating messaging diagnostics at a diagnostic component in a send messaging pipeline.

9. The method as recited in claim 1, wherein the act of the diagnostic control component activating message diagnostics at one or more diagnostic components comprises an act of activating messaging diagnostics at the diagnostic control component.

10. The method as recited in claim 1, wherein the act of the diagnostic control component activating message diagnostics at one or more diagnostic components comprises an act of sending instructions to one or more diagnostic components to load a message filter.

11. The method as recited in claim 10, wherein the message filter is loaded from a filter table.

12. The method as recited in claim 10, wherein the message filter includes XPath statements.

13. The method as recited in claim 1, wherein the act of the diagnostic control component activating message diagnostics in accordance with instructions contained in the received control message comprises an act of the diagnostic control component loading a message filter.

14. The method as recited in claim 1, wherein the act of the diagnostic control component activating message diagnostics in accordance with instructions contained in the received control message comprises an act of activating one or more diagnostic operations selected from among debugging, testing, tracing and profiling.

15. In a network environment that includes a computing system capable of transferring messages between other computing systems in the network environment, a method for implementing an integrated diagnostic operation in a messaging pipeline, the method comprising the following:

an act of the messaging pipeline accessing a message;

an act of passing the accessed message to a diagnostic component positioned in the messaging pipeline; and an act of the diagnostic component performing a diagnostic operation based on the contents of the accessed message, the diagnostic operation being performed in accordance with instructions contained in a previously processed control message.

16. The method as recited in claim 15, wherein the act of accessing a message comprises an act of accessing a Simple Object Access Protocol (SOAP) envelope.

17. The method as recited in claim 15, wherein the act of passing the accessed message to a diagnostic component positioned in the message pipeline comprises an act of passing the accessed message to a diagnostic component positioned in a messaging receive pipeline.

18. The method as recited in claim 15, wherein the act of passing the accessed message to a diagnostic component positioned in the message pipeline comprises an act of passing the accessed message to a diagnostic component positioned in a messaging send pipeline.

19. The method as recited in claim 15, wherein the act of passing the accessed message to a diagnostic component positioned in a message path of the accessed message comprises an act of passing the accessed message to a diagnostic control component.

20. The method as recited in claim 15, further comprising:

an act of matching the contents of the accessed message to filter criteria prior to performing the diagnostic operation.

21. The method as recited in claim 20, wherein the act of matching the contents of the accessed message comprises an act of matching the contents of the accessed message to a portion of an XPath statement.

22. The method as recited in claim 15, wherein the act of the diagnostic component performing a diagnostic operation comprises an act of including a portion of the contents of the accessed message in a diagnostic report.

23. The method as recited in claim 22, further comprising:

an act of storing the diagnostic report.

24. The method as recited in claim 22, further comprising:

an act re-directing the diagnostic report as a SOAP message to a remote recipient.

25. The method as recited in claim 15, wherein the act of the diagnostic component generating performing a diagnostic operation comprises an act of generating a diagnostic report in accordance with instructions contained in a header of a Simple Object Access Protocol (SOAP) envelope.

26. The method as recited in claim 15, wherein the act of the diagnostic component performing a diagnostic operation comprises an act of a diagnostic control component generating a diagnostic report.

27. The method as recited in claim 15, wherein the act of the diagnostic component performing a diagnostic operation comprises an act of performing a diagnostic operation selected from among testing, debugging, tracing, and profiling the accessed message.

28. The method as recited in claim 15, further comprising:
an act of passing the accessed message through one or more other messaging pipeline components that are positioned in the messaging pipeline.

29. The method as recited in claim 28, wherein the act of passing the accessed message through one or more components in a messaging pipeline comprises passing the accessed message through one or more components in a messaging receiving pipeline.

30. The method as recited in claim 29, further comprising:
an act of delivering a modified message to a Web service.

31. The method as recited in claim 28, wherein the act of passing the accessed message through one or more components in a messaging pipeline comprises passing the accessed message through one or more components in a messaging receiving pipeline.

32. The method as recited in claim 31, further comprising:
an act of delivering a modified message to another computer system.

33. A computer program product for use in a network environment that includes a computing system capable of transferring messages between other computing systems in the network environment, the computer program product for implementing a method for activating integrated messaging diagnostics in a messaging pipeline, the computer program product comprising one or more computer storage media having stored thereon computer-executable instructions that, when executed by a processor, cause the computer system to perform the following:
receive a control message;
pass the received control message through one or more pipeline components that are positioned in the messaging pipeline;
pass the received control message to a diagnostic control component positioned in the messaging pipeline subsequent to passing the received control message through one or more pipeline components; and
activate message diagnostics at one or more diagnostic components positioned within one or more messaging pipelines in accordance with instructions contained in the received control message.

34. The method as recited in claim 33, wherein computer-executable instructions that when executed cause the computer system to receive a control message comprise computer-executable instructions that when executed cause the computer system to receive a Simple Object Access Protocol (SOAP) envelope.

35. The method as recited in claim 33, wherein computer-executable instructions that when executed cause the computer system to activate message diagnostics at one or more diagnostic components positioned within one or more messaging pipelines comprise computer-executable instructions that when executed cause the computer system to activate message diagnostics at a diagnostic component positioned within messaging receive pipeline.

36. The method as recited in claim 33, wherein computer-executable instructions that when executed cause the computer system to activate message diagnostics at one or more diagnostic components positioned within one or more messaging pipelines comprise computer-executable instructions that when executed cause the computer system to activate message diagnostics at a diagnostic component positioned within messaging send pipeline.

37. The method as recited in claim 33, wherein computer-executable instructions that when executed cause the computer system to activate message diagnostics at one or more diagnostic components positioned within one or more messaging pipelines comprise computer-executable instructions that when executed cause the computer system to activate message diagnostics selected from among one or more of debugging, testing, profiling, and tracing.

38. A computer program product for use in a network environment that includes a computing system capable of transferring messages between other computing systems in the network environment, the computer program product for implementing a method for implementing an integrated diagnostic operation in a messaging pipeline, the computer program product comprising one or more computer storage media having stored thereon computer-executable instructions that, when executed by a processor, cause the computer system to perform the following:
access a message;
pass the accessed message to a diagnostic component positioned in a messaging pipeline; and
perform a diagnostic operation based on the contents of the accessed message, the diagnostic operation being performed in accordance with instructions contained in a previously processed control message.

39. The method as recited in claim 38, wherein computer-executable instructions that when executed cause the computer system to access a message comprise computer-executable instructions that when executed cause the computer system to access a Simple Object Access Protocol (SOAP) envelope.

40. The computer program product as recited in claim 38, further comprising:
computer-executable instructions that, when executed, cause the computer system to match the contents of the accessed message to filter criteria prior to performing the diagnostic operation.

41. The method as recited in claim 38, wherein computer-executable instructions that when executed cause the computer system to perform a diagnostic operation comprise computer-executable instructions that when executed cause the computer system to perform a diagnostic operation selected from among testing, debugging, tracing, and profiling the accessed message.

* * * * *